United States Patent [19]

Nagano

[11] Patent Number: 4,793,444
[45] Date of Patent: Dec. 27, 1988

[54] CALIPER BRAKE FOR A BICYCLE
[75] Inventor: Masashi Nagano, Izumi, Japan
[73] Assignee: Shimano Industrial Company Limited, Osaka, Japan
[21] Appl. No.: 70,529
[22] Filed: Jul. 7, 1987
[30] Foreign Application Priority Data
 Jul. 12, 1986 [JP] Japan .......................... 61-107029[U]
[51] Int. Cl.$^4$ ................................................ B62L 1/02
[52] U.S. Cl. ............................... 188/24.12; 188/24.19; 188/24.21; 188/72.3; 267/155
[58] Field of Search ........................ 188/24.11–24.22, 188/72.3, 72.1, 72.9, 216; 267/155

[56] References Cited

U.S. PATENT DOCUMENTS

| | | | |
|---|---|---|---|
| 2,160,181 | 5/1939 | Taylor ........................... | 188/24.21 X |
| 3,811,541 | 5/1974 | Yoshikawa ................... | 188/24.21 X |
| 4,585,094 | 4/1986 | Rottenkolber et al. .......... | 188/24.22 |
| 4,597,474 | 7/1986 | Nagano .............................. | 188/24.21 |

FOREIGN PATENT DOCUMENTS 17-20329 11/1942 Japan .

Primary Examiner—Douglas C. Butler
Attorney, Agent, or Firm—Stevens, Davis, Miller & Mosher

[57] ABSTRACT

A caliper brake for a bicycle which includes a pair of fixing bases, brake arms including respective brake shoes and bosses, and return springs, wherein the boss of each brake arm is provided with a cavity in which the return spring is housed. A spring holder for each return spring is rotatably mounted with respect to the associated brake arm boss. Since the relative rotation of the spring holder with respect to the boss is regulated in a predetermined range, the return spring is given a preload, and the spring holder is fixed to the fixing base, each brake arm can be easily assembled with the fixing base.

22 Claims, 2 Drawing Sheets

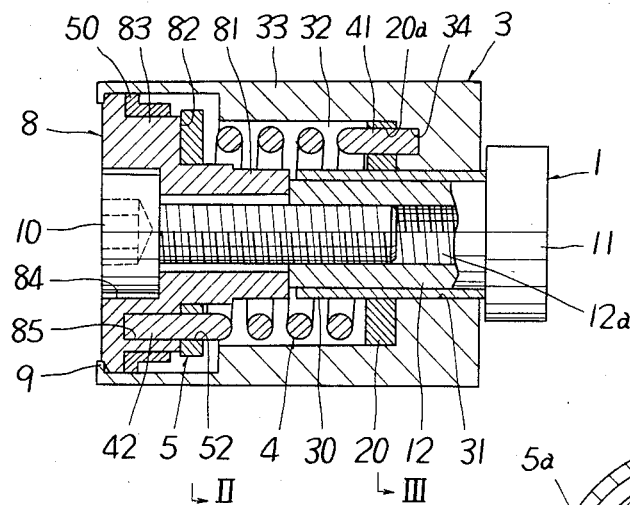
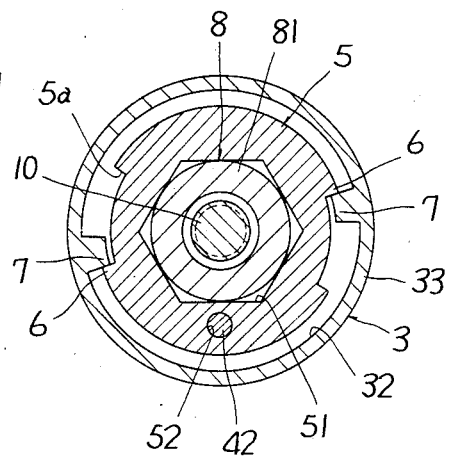
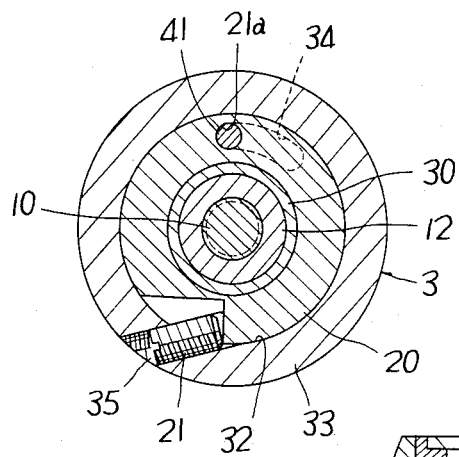
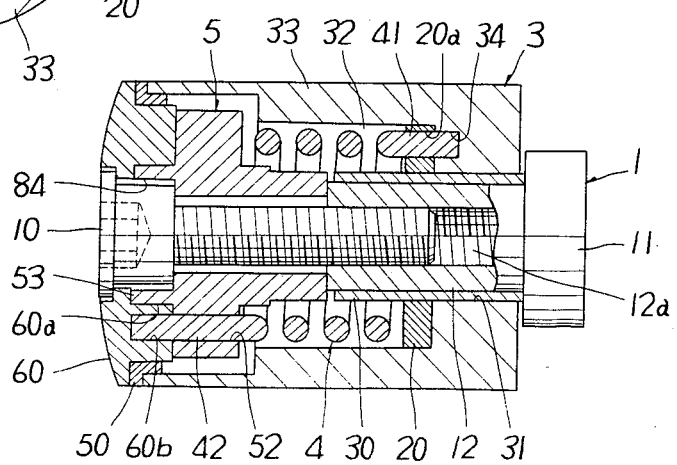

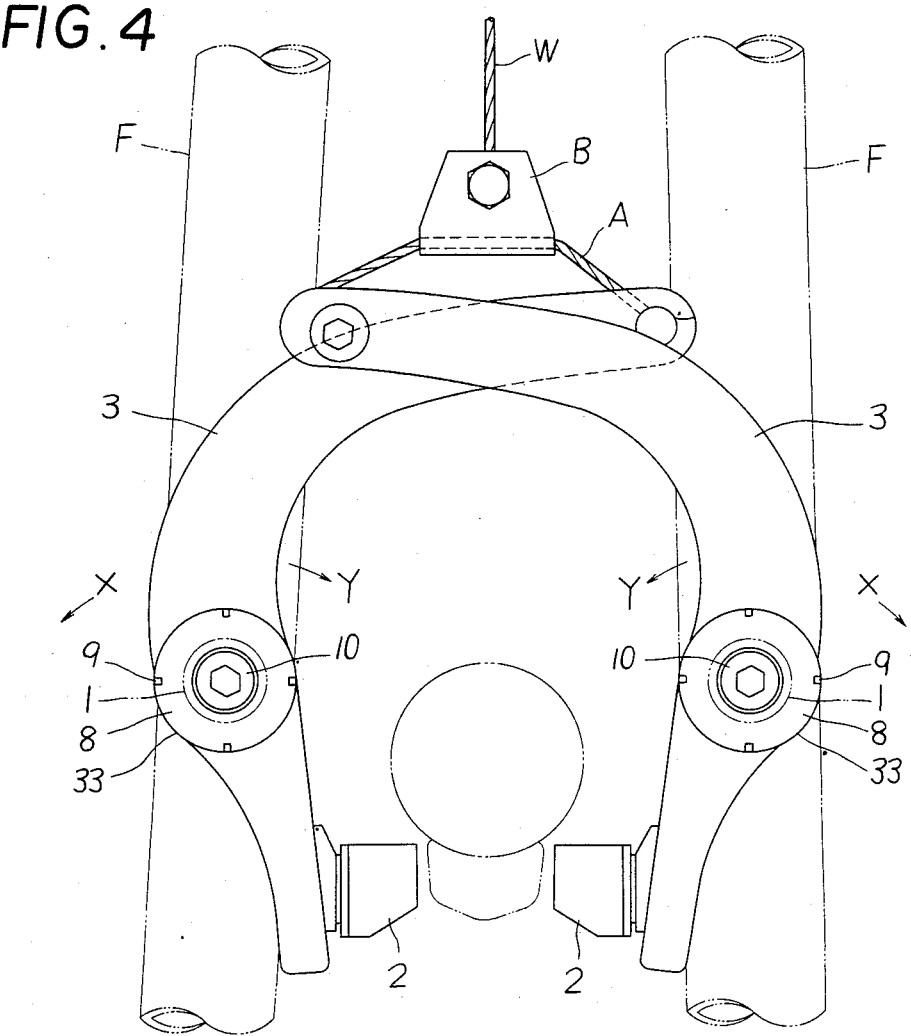
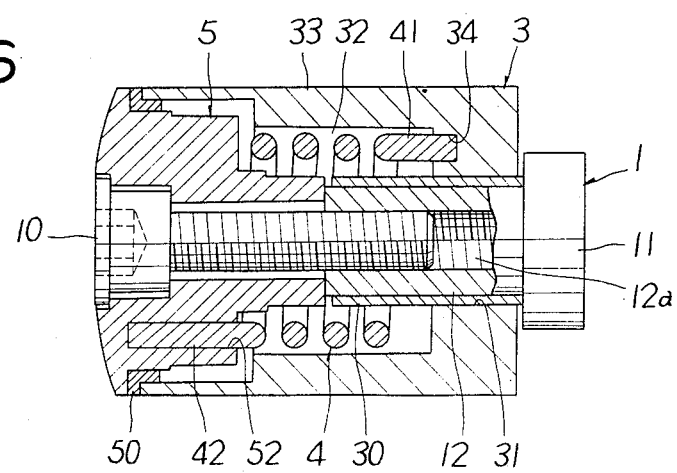

CALIPER BRAKE FOR A BICYCLE

FIELD OF THE INVENTION

The present invention relates to a caliper brake for a bicycle, and more particularly, to a caliper brake of a cantilever or center-pull type, which supports independently and rotatably to fixing bases a pair of brake arms having brake shoes respectively and is provided between the brake arms and the fixing bases with return springs biasing the brake shoes for enlarging an interval therebetween.

BACKGROUND OF THE INVENTION

A conventional cantilever type caliper brake which is well-known is disclosed in Japanese Utility Model Publication Gazette No. Sho 42-20,329, in which a pair of brake arms having brake shoes are supported rotatably to a pair of fixing bases fixed by welding to a front fork or a rear fork at the bicycle frame, and between the fixing bases and the brake arms are interposed a pair of return springs for biasing the brake arms in the direction of enlarging the distance between the brake shoes respectively, so that a control wire connected to a free end of each brake arm is pulled to swing each brake arm, thereby exerting the braking action.

The fixing bases at the caliper brake are welded to the bicycle frame at a factory and the brake arms, return springs and mounting screws for mounting the brake arms to the fixing bases are sold as separate parts, for example, as a set in one package. A store or a user mounts on the fixing bases prefixed to the bicycle frame through the mounting screws the brake arms while incorporating therein the return springs respectively, at which time a preload is applied to each return spring.

Such assembly of the brake arm while applying the preload to each return spring is very difficult for the store or the user.

SUMMARY OF THE INVENTION

An object of the present invention is to provide a caliper brake wherein it is easy to incorporate each brake arm to each fixing base without the need for a store or a user to apply a preload to each return spring.

The present invention is characterized in that a caliper brake for a bicycle, which is provided with fixing bases fixed to the bicycle frame, a pair of brake arms having brake shoes and bosses supported rotatably to the fixing bases respectively, and a pair of return springs having first and second spring legs or ends and biasing the brake arms in the direction of enlarging an interval between the brake shoes, is so constructed that at the boss of each brake arm is provided a cavity into which the return spring is housed. The first spring leg of each return spring is retained to each brake arm, and a pair of spring holders each having a retaining bore retaining the second spring leg of each return spring is mounted with respect to the boss rotatably relative thereto. A rotation regulation means is provided for regulating within a predetermined range the rotation of each spring holder relative to the boss so as to give a preload to the return spring, and a fixing means is provided for fixing the spring holders to the fixing bases respectively are provided.

The present invention constructed as the described above has the following advantages: The spring holder, during assembly, is rotated with respect to the boss at the brake arm to enable supply of the preload to each return spring; the rotation regulation means can maintain the preload applying condition; and each spring holder is held to the brake arm by a biasing force of the return spring given the preload, whereby each brake arm, return spring and spring holder are independently unitized. Accordingly, the user can assemble with ease the parts as a unit to the fixing base fixed to the bicycle frame without applying a preload to each return spring.

In addition, each return spring uses a coil spring having first and second legs and each spring holder is rotated with respect to the boss at the brake arm to apply the preload to the return spring. The rotation of the spring holder with respect to the boss is regulated by the rotation regulation means, thereby enabling the preload on the return spring to be maintained.

The fixing means preferably uses a fixing bolt, and a tubular shaft having a threaded bore screwable with the bolt is provided at the fixing base.

Another object of the present invention is to provide a novel closing means for closing the cavity at the boss of each brake arm and a novel adjusting means for adjusting the preload on the return spring. If the cavity were left open to the exterior, dust or rain water would be apt to enter. Hence, a holder having a larger diameter portion for closing the cavity and a holding portion for holding the spring holder, is provided, or alternatively a cap for closing the cavity is provided, thereby solving the above problem. In addition, in an embodiment employing a holder, each brake arm is provided with stoppers for restraining the holder from moving axially outwardly. In addition, the cap may be integral with the spring holder.

When the return spring is housed in the cavity and the brake arm, return spring and spring holder are unitized, the preload on the return spring cannot be adjusted, but an adjusting means is provided which adjusts one spring leg of the return spring in position with respect to the other, thereby facilitating adjustment of the preload.

In this embodiment, for example, a retainer for retaining the first spring leg of the return spring is rotatably housed in the cavity, and each brake arm is provided with an adjuster which restrains the rotation of the retainer and adjusts the restraining position thereof.

The above and other objects of the invention will be apparent by reference to the following description taken in connection with the accompanying drawings.

BRIEF DESCRIPTION OF THE DRAWINGS

FIG. 1 is an enlarged sectional view of the principal portion of an embodiment of a caliper brake of the invention, FIG. 2 is a sectional view taken on the line II—II in FIG. 1, FIG. 3 is a sectional view taken on the line III—III in FIG. 1, FIG. 4 is a front view of the entire caliper brake of the invention, and FIGS. 5 and 6 are sectional views of the principal portions of the modified embodiments of the invention.

DETAILED DESCRIPTION OF THE INVENTION

A caliper brake shown in FIG. 4 is of a cantilever type and is constructed that a pair of brake arms having brake shoes 2 are supported at intermediate portions independently rotatably to a pair of fixing bases 1 welded to a front fork or a rear fork at the bicycle frame F, and a pair of return springs 4 for biasing the brake arms 3 in the direction of enlarging the distance between the brake shoes 2 respectively, so that a control wire W is pulled to rotate each brake arm 3 against the return spring 4 in the direction of the arrow X in FIG. 4 and is loosened to rotate each brake arm 3 by a biasing force of the return spring 4 in the direction of the arrow Y in FIG. 4.

In addition, the pair of fixing bases 1 and brake arms 3 are similar in construction, where they will be described as to each one for simplification thereof.

The fixing base 1, as shown in FIG. 1, is provided with a body 11 having the mounting surface to the bicycle frame and a tubular shaft 12 projecting outwardly from the surface of the body 11 reverse to the mounting surface.

The brake arm 3, as shown in FIG. 4, is bent at an intermediate portion to be shaped like a bell-crank, and is provided at an intermediate portion with a fitting bore 31 to be fitted onto the outer periphery of the tubular shaft 12 as shown in FIG. 1. Brake arm 3 includes one end a brake shoe 2 and at its other end a hanging wire A connected at the center thereof to the control wire W through a carrier B.

The return spring 4 comprises a coil spring having at respective ends first and second spring legs 41 and 42 projecting axially outwardly.

In an embodiment shown in FIGS. 1 through 4, the brake arm 3 is rovided at its intermediate portion with a tubular boss 33 having fitting bore 31 and a cavity 32 axially extending and in continuation thereof through a shoulder extending radially outwardly and having a retaining bore 34 extending axially of the boss 33. The return spring 4 is housed in the cavity 32 and retained at the first spring leg 41 to the retaining bore 34. A spring holder 5, having a retaining bore 52 to which the second spring leg 42 at the return spring 4 is retained, is mounted on the fixing base 1 such that it is rotatable relative to the boss 33, and between the spring holder 5 and the boss 33 are provided a rotation regulation means which regulates the rotation of the spring holder 5 relative to the boss 33 in a predetermined range and applies a preload to the return spring 4. A fixing means is provided for fixing the spring holder 5 to the fixing base 1.

In the above construction, the spring holder 5, as shown in FIG. 2, comprises a substantially disc-shaped member having at its center a tool fitting polygonal bore 51 for rotatably operating the spring holder 5. Holder 5 is provided at a radially intermediate portion with the retaining bore 52, into which the second spring leg 42 of return spring 4 is insertably retained. Although one retaining bore 52 is shown in FIG. 2, a plurality of them may be disposed circumferentially at predetermined intervals. Thus, one of the retaining bores 52 to retain the spring leg 42 is selected so as to enable adjustment of the preload.

The rotation regulation means, as shown in FIG. 2, comprises engaging projections 6 projecting radially outwardly from the outer periphery of the spring holder 5 and stoppers 7 projecting radially inwardly from the inner periphery of the cavity 32 and opposite to the engaging projections 6 in the rotating direction of the spring holder 5 respectively. The spring holder 5 rotates to engage the engaging projections 6 with the stoppers 7 respectively, whereby the relative rotation of the spring holder 5 is regulated in a predetermined range to apply a preload to the return spring 4. In addition, at the outer periphery of the spring holder 5 are provided rotation regulating portions 5a which are opposite circumferentially to the engaging projections 6 at predetermined intervals and which, when the brake arm 3 rotates against the biasing force of return spring 4, contact with the stoppers 7 respectively, thereby regulating a rotation range of the brake arm 3 in the direction of reducing the interval between the brake shoes 2.

Also, the spring holder 5 is mounted to the boss 33 through an engaging resistance of each engaging projection 6 with each stopper 7 by the biasing force of the return spring 4 which is given the preload, thereby preventing the spring holder 5 from escaping from the boss 33. In this embodiment, the first and second spring legs 41 and 42 at the return spring 4 engage with an retaining bores 34 and 52 and the engaging resistance exists between the spring legs 41 and 42 and the retaining bores 34 and 52 to thereby also prevent the spring holder 5 from escaping from the boss 33.

In addition, in FIG. 1, into the cavity 32 is inserted a cylindrical holder 8 having a smaller diameter holding portion 81 inserted into the polygonal bore 51 at the spring holder 5 and a larger diameter portion 83 in continuation of one end of the holding portion 81 through a larger diameter stepped portion 82. Holder 8 closes an opening of the cavity 32 to thereby form a closing means. The holding portion 81 holds the spring holder 5 and abuts at an end face against the utmost end of the tubular shaft 12, and the larger diameter portion 83 closes the cavity 32 to prevent dust or rain water from entering thereinto. A recess 84 is formed at the end face of the larger diameter portion 83 at the holder 8, and a retaining bore 85 corresponding to the retaining bore 52 at the spring holder 5 is formed at the larger diameter stepped portion 83 and retains the second spring leg 42 to hinder through this construction the rotation of spring holder 5 with respect to the holder 8. At the open end of the boss 33 are provided stoppers 9 to prevent the holder 8 from moving axially outwardly. The stoppers 9 comprise a plurality of projections projecting axially outwardly and circumferentially spaced at predetermined intervals and then bent radially inwardly of the boss, and the larger diameter portion 83 at the holder 8 is provided with recesses into which the projections of the stopper 9 are received.

The fixing means preferably uses a headed fixing bolt 10 having a screw thread, which is supported at the head thereof into the recess 84 at the larger diameter portion 83 of the holder 8 and screws at a screw thread with the threaded bore 12a at the tubular shaft 12 so as to bring the end face of the holding portion 81 in press-contact with the utmost end of the tubular shaft 12, thereby fixing the holder 8 to the fixing base 1 to restrain the rotation of the spring holder 5.

The caliper brake according to the invention is provided with an adjusting means for adjusting the first spring leg 41 in position with respect to the second spring leg 42 at the return spring 4, thereby adjusting the preload thereof.

The adjusting means, as shown in FIG. 3, includes the retaining bore 34 which is elongate in the shape of a circular arc so that the first spring leg 41 at the return spring is movable circumferentially thereof with respect to the brake arm 3, and is provided with a substantially disc-shaped retainer 20 having a retaining bore 20a for retaining the first spring leg 41, and an adjuster 21 comprising a bolt engageable with the retainer 20 to restrain its rotation and adjust the restraining position. The retainer 20 is rotatably housed in the cavity 32, and the adjuster 21 screws with a threaded bore 35 provided at the boss 33 and rotates to change the rotation restraining position of the retainer 20, thereby adjusting the preload on the return spring 4. In addition, the adjusting means need not include retainer 20, but may instead bring the utmost end of adjuster 21 into direct contact with the first spring leg 41.

Also, in FIG. 1, reference numeral 30 designates a bush fitted onto the tubular shaft 12, and 50 designates a tubular sealing member of synthetic resin.

A caliper brake, constructed as described above, during assembly first fixes by welding the mounting surface of the fixing base 1 to the bicycle frame F and assembles brake arm 3, return spring 4 and spring holder 5 as a unit.

In detail, the return spring 4 and spring holder 5 are inserted into the cavity 32, and first spring leg 41 and second spring leg 42 are insertably retained to the retaining bores 34 at the brake arm 3 and retaining bore 52 at the spring holder 5 respectively. A tool fitted into the tool fitting polygonal bore 51 at the spring holder 5 is used to rotate the spring holder 5 relative to the boss 33 so as to apply a preload to the spring holder 5. Spring holder 5 in this condition is moved deeper within cavity 32 to contact the engaging projections 6 with the stoppers 7 to regulate in a predetermined range the rotation of the spring holder 5 relative to the boss 33. Holder 8 is inserted into and cavity 32, the spring holder 5 is held to the holding portion 81 at the holder 8. The second spring leg 42 is insertably retained to the retaining bore 85 at the holder 8, and the projections of the stoppers 9 are bent radially inwardly to restrain the axially outward movement of holder 8, thereby utilizing the brake arm 3, return spring 4, spring holder 5 and holder 8.

The brake arm 3 thus unitized is mounted on the fixing base 1 such that the fitting bore 31 at the boss 33 is fitted onto the tubular shaft 12 and the fixing bolt 10 is inserted into the holder 8 to screw with the threaded bore 12a at the tubular shaft 12. The fixing bolt 10 is screwably tightened to fix to the fixing base 1 the holder 8 and spring holder 5 held thereto.

Accordingly, the present invention can unitize the brake arm 3, return spring 4 and spring holder 5 as described above, whereby the user assembles with ease the brake arm 3 to the fixing base 1 merely by screwing the fixing bolt 10 without applying preload to the return spring 4.

Moreover, the return spring 4 is contained in the cavity 32 which is closed by the larger diameter portion 83 at the holder 8, thereby preventing contamination from dust or rain water. Also, the return spring 4, which is given a preload in the workshop, can use a spring of a small spring constant. Furthermore, since the adjuster 21 adjusts the preload, a shoe clearance between each brake shoe 2 and a wheel rim can easily be adjusted to be uniform.

Alternatively, the disc-like spring holder 5 in another embodiment may, as shown in FIG. 5, be integral with the holder 8 which constitutes the closing means for closing the cavity 32.

In this case, a cap 60 may be provided outside the spring holder 5 to close the cavity 32.

Referring to FIG. 5, engaging projections 53 are provided at the outside end surface of spring holder 5, and cap 60 is provided with bores 60a engageable with the projections 53 respectively and held to the spring holder 5. A sealing member 50 is provided between the outer periphery of the cap 60 and the end face of the boss 33 and a retaining bore 52 provided at the spring holder 5 is made larger in length. A retaining bore 60b corresponding to the retaining bore 52 is provided at the cap 60, thereby retaining the second spring leg 42 to the retaining bore 60b.

Preferably cap 60 is formed of several kinds of material, such as synthetic resin, different in color and configuration from the spring holder 5. Also, in the FIG. 5 embodiment, it is preferable that a wire rod coated by, for example, synthetic resin, is wound onto the outer peripheries of the boss 33 and cap 60 in order to ensure holding of the spring holder 5 to the boss 33.

The engaging projections 6 and stoppers 7 which form the rotation regulation means are not defined or limited in construction to the illustrated embodiments.

Also, the fixing means is not defined or limited in construction to the illustrated embodiments.

Alternatively, instead of the stoppers 9, blockings engageable with the engaging projections 6 at the spring holder 5 may be provided at the inner periphery of the cavity 32 and may block the axially outward movement of the spring holder 5. Also alternatively, a snap ring may be provided at the inner periphery of the boss 33. Thus, the stoppers 9 are not particularly defined or limited in construction.

Also, the cap 60 may alternatively be integral with the spring holder 5 as shown in FIG. 6.

Alternatively, the spring holder 5 may be rotated relative to the boss 33, thereby enabling the second spring leg 42 at the return spring 4 to be adjusted in position with respect to the first spring leg 41. In this embodiment, the spring holders 5 is fixed in the adjusted position to the fixing base 1 through the fixing bolt 10.

Although several embodiments have been described above, they are merely exemplary of the invention and not to be construed as limiting, the invention being defined solely by the appended claims.

What is claimed is:

1. A caliper brake for a bicycle, comprising:
 (a) a fixing base,
 (b) a brake arm including a brake shoe and a boss at which said brake arm is supported rotatably to said fixing base, said boss having a cavity,
 (c) a return spring housed in said cavity and having first and second spring legs, said first spring leg being retained to said brake arm,
 (d) a spring holder having a retaining bore retaining said second spring leg of said return spring and mounted rotatably with respect to said boss, said spring holder comprising means for applying a preload to said return spring responsive to rotation of said holder relative to said boss,
 (e) a rotation regulation means for regulating within a predetermined range the rotation of said spring holder relative to said boss and for holding said preload applied to said return spring by said spring holder, said rotation regulation means comprising a first regulating portion provided at said spring holder and a second regulating portion provided at said boss, said second regulating portion being engageable with said first regulating portion to limit rotation of said spring holder relative to said boss within said predetermined range, and
 (f) a fixing means which fixes said spring holder to said fixing base.

2. A caliper brake for a bicycle according to claim 1, further comprising a closing means for closing one end of said cavity.

3. A caliper brake for a bicycle according to claim 2, wherein said closing means is provided with a cylindrical holder having a smaller diameter holding portion for holding said spring holder and a larger diameter portion for closing said one end of said cavity.

4. A caliper brake for a bicycle according to claim 3, wherein said brake arm is provided with stoppers which restrain said cylindrical holder from moving axially outwardly of said cavity.

5. A caliper brake for a bicycle according to claim 2, wherein said closing means is provided with a cap positioned outside said spring holder to close one end of said cavity.

6. A caliper brake for a bicycle according to claim 5, wherein said cap is integral with said spring holder.

7. A caliper brake for a bicycle according to claim 1, further comprising an adjusting means which adjusts one of said spring legs of said return spring in position with respect to the other, thereby adjusting the preload on said return spring.

8. A caliper brake for a bicycle according to claim 7, wherein said adjusting means adjusts a retaining position at which said first spring leg of said return spring is retained to said brake arm, said first spring leg being movable with respect to said brake arm, said brake arm being provided with an adjuster for adjusting the retaining position of said first spring leg.

9. A caliper brake for a bicycle according to claim 8, further comprising a retainer for retaining said first spring leg at said return spring, said retainer being housed rotatably in said cavity, said boss being provided with an adjuster which is retained to said retainer so as to restrain rotation thereof and adjust the restraining position of the same.

10. A caliper brake for a bicycle according to claim 1, wherein the position of said second spring leg of said return spring is adjusted in position responsive to relative rotation of said spring holder with respect to said boss, so that said fixing means fixes said spring holder in the adjusted position to said fixing base.

11. A caliper brake for a bicycle according to claim 1, wherein said fixing base is provided with a tubular shaft having a threaded bore, said fixing means comprising a fixing bolt screwable with said threaded bore.

12. A caliper brake for a bicycle, comprising:
(a) a first fixing base and a second fixing base,
(b) a first brake arm including a first brake shoe and a first boss at which said first brake arm is supported rotatably to said first fixing base, said first boss having a first cavity,
(c) a second brake arm including a second brake shoe and a second boss at which said second brake arm is supported rotatably to said second fixing base, said second boss having a second cavity,
(d) a first return spring housed in said first cavity and having first and second spring legs, said first spring leg being retained to said first brake arm,
(e) a second return spring housed in said second cavity and having first and second spring legs, said first spring leg of said second return spring being retained to said second brake arm,
(f) a spring spring holder having a first retaining bore retaining said second spring leg of said first return spring and mounted rotatably with respect to said first boss, said first spring holder comprising means for applying a preload to said first return spring responsive to rotation of said first spring holder relative to said first boss,
(g) a second spring holder having a second retaining bore retaining said second spring leg of said second return spring and mounted rotatably with respect to said second boss, said second spring holder comprising means for applying a preload to said second return spring responsive to rotation of said second spring holder relative to said second boss,
(h) a first rotation regulation means for regulating within a first predetermined range the rotation of said first spring holder relative to said first boss and for holding said preload applied to said first return spring by said first spring holder, said first rotation regulation means comprising a first regulating portion provided at said first spring holder and a second regulating portion provided at said first boss, said second regulating portion being engageable with said first regulating portion to limit rotation of said first spring holder relative to said boss within said first predetermined range,
(i) a second rotation regulation means for regulating within a second predetermined range the rotation of said second spring holder relative to said second boss and for holding said preload applied to said second return spring by said second spring holder, said second rotation regulation means comprising a first regulating portion provided at said second spring holder and a second regulating portion provided at said second boss, said second regulating portion of said second rotation regulation means being engageable with said first regulating portion of said second rotation regulation means to limit rotation of said second spring holder relative to said second boss within said second predetermined range,
(j) a first fixing means which fixes said first spring holder to said first fixing base, and
(k) a second fixing means which fixes said second spring holder to said second fixing base.

13. A caliper brake for a bicycle according to claim 12, further comprising a first closing means for closing one end of said first cavity and a second closing means for closing one end of said second cavity.

14. A caliper brake for a bicycle according to claim 13, wherein said first closing means is provided with a first cylindrical holder having a smaller diameter holding portion for holding said first spring holder and a larger diameter portion for closing said one end of said first cavity, and said second closing means is provided with a second cylindrical holder having a smaller diameter portion for holding said second spring holder and a larger diameter portion for closing said one end of said second cavity.

15. A caliper brake for a bicycle according to claim 14, wherein said first brake arm is provided with stopper means which restrains said first cylindrical holder from moving axially outwardly of said first cavity and said second brake arm is provided with stopper means which restrains said second cylindrical holder from moving axially outwardly of said second cavity.

16. A caliper brake for a bicycle according to claim 13, wherein said first closing means is provided with a first cap positioned outside said first spring holder to close said one end of said first cavity and said second closing means is provided with a second cap positioned outside said second spring holder to close said one end of said second cavity.

17. A caliper brake for a bicycle according to claim 16, wherein said first cap is integral with said first spring holder and said second cap is integral with said second spring holder.

18. A caliper brake for a bicycle according to claim 12, further comprising an adjusting means for adjusting one of said spring legs of one of said first return spring and said second return spring in position with respect to the other, thereby adjusting the preload on said one of said first return spring and said second return spring.

19. A caliper brake for a bicycle according to claim 18, wherein said adjusting means adjusts a retaining position at which said first spring leg of said one of said first return spring and said second return spring is retained to the associated brake arm, said first spring leg of said one of said first return spring and said second return spring being moveable with respect to said associated brake arm, said associated brake arm being provided with an adjuster for adjusting the retaining position of said first return spring of said one of said first return spring and said second return spring.

20. A caliper brake for a bicycle according to claim 19, further comprising a retainer for retaining said first spring leg of said one of said first return spring and said second return spring, said retainer being housed rotatably in said associated cavity, the associated boss being provided with an adjuster which is retained to said retainer so as to restrain rotation thereof and adjust the restraining position of the same.

21. A caliper brake for a bicycle according to claim 12, wherein the position of said second spring leg of said first return spring is adjusted in position responsive to relative rotation of said first spring holder with respect to said first boss, so that said first fixing means fixes said first spring holder in the adjusted position to said first fixing base, and the position of said second spring leg of said second return spring is adjusted in position responsive to relative rotation of said second spring holder with respect to said second boss, so that said second fixing means fixes said second spring holder in the adjusted position to said second fixing base.

22. A caliper brake for a bicycle according to claim 12, wherein said first fixing base is provided with a first tubular shaft having a first threaded bore, said first fixing means comprises a first fixing bolt screwable with said first threaded bore, and said second fixing base is provided with a second tubular shaft having a second threaded bore, said second fixing means comprising a second fixing bolt screwable with said second threaded bore.

* * * * *